(12) United States Patent
Balannik et al.

(10) Patent No.: US 8,605,871 B2
(45) Date of Patent: Dec. 10, 2013

(54) METHODS AND APPARATUS TO SEND VOICE MESSAGES

(75) Inventors: Vadim Balannik, Arlington Heights, IL (US); Patrick Dell Ellis, Lake in the Hills, IL (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/328,560

(22) Filed: Dec. 16, 2011

(65) Prior Publication Data

US 2013/0040613 A1 Feb. 14, 2013

Related U.S. Application Data

(63) Continuation-in-part of application No. 13/207,193, filed on Aug. 10, 2011.

(51) Int. Cl.
*H04M 1/64* (2006.01)

(52) U.S. Cl.
USPC ........................ 379/88.25; 455/413

(58) Field of Classification Search
USPC ........... 379/67.1, 68, 84, 88.18, 88.22, 88.25; 455/412.1, 413
See application file for complete search history.

(56) References Cited

U.S. PATENT DOCUMENTS

| | | | |
|---|---|---|---|
| 5,283,818 A | | 2/1994 | Klausner et al. |
| 5,390,236 A | | 2/1995 | Klausner et al. |
| 5,509,061 A | * | 4/1996 | Amereller et al. ............ 379/229 |
| 5,572,576 A | | 11/1996 | Klausner et al. |
| 5,623,538 A | * | 4/1997 | Petty .......................... 379/88.13 |
| 5,781,614 A | * | 7/1998 | Brunson .................... 379/88.14 |
| 5,781,615 A | * | 7/1998 | Bales et al. ................. 379/88.18 |
| 5,903,627 A | * | 5/1999 | Shaffer et al. ................ 379/67.1 |
| 6,222,909 B1 | * | 4/2001 | Qua et al. .................... 379/88.22 |
| 7,359,495 B2 | * | 4/2008 | Chan et al. .................. 379/201.01 |
| 7,769,364 B2 | | 8/2010 | Logan et al. |
| 8,189,748 B2 | * | 5/2012 | Susama et al. ............. 379/88.17 |
| 2002/0023099 A1 | * | 2/2002 | Wendelrup .................... 707/200 |
| 2004/0202291 A1 | * | 10/2004 | Skinner ......................... 379/67.1 |
| 2006/0025114 A1 | * | 2/2006 | Bales et al. ..................... 455/413 |
| 2006/0262911 A1 | * | 11/2006 | Chin et al. ................. 379/88.18 |
| 2007/0282654 A1 | | 12/2007 | Sarkar |
| 2009/0210917 A1 | * | 8/2009 | Lafreniere et al. ............ 725/106 |
| 2010/0150324 A1 | * | 6/2010 | Albert et al. ................ 379/88.22 |
| 2010/0279663 A1 | | 11/2010 | Wang et al. |
| 2011/0098022 A1 | | 4/2011 | Shaw et al. |

FOREIGN PATENT DOCUMENTS

| | | |
|---|---|---|
| EP | 2073516 | 6/2009 |
| GB | 2463759 | 3/2010 |

OTHER PUBLICATIONS

European Patent Office, Extended Search Report issued in EP Application No. 11177105.1, dated Feb. 3, 2012, 9 pages.
Open Mobile Reliance, OMA-COM-EVVM-2010-0045R04-CR, Support of Timed Delivery, COM EVVM, Change Request, 2010, 3 pages.

* cited by examiner

*Primary Examiner* — Olisa Anwah
(74) *Attorney, Agent, or Firm* — Steven M. Greenberg, Esq.; Carey, Rodriguez, Greenberg & O'Keefe

(57) ABSTRACT

Methods and apparatus to send voice messages are disclosed. One example method includes receiving a selection of a service from a plurality of services; determining whether the selected service supports sending a voice message; recording the voice message using a mobile communication device; sending the voice message from the mobile communication device using the selected service if the selected service supports sending the voice message.

16 Claims, 7 Drawing Sheets

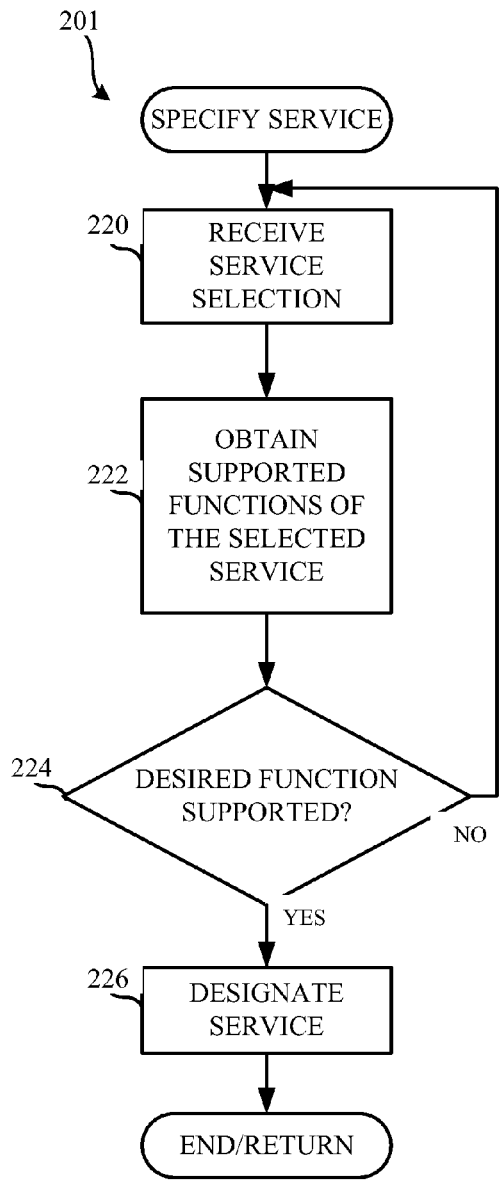 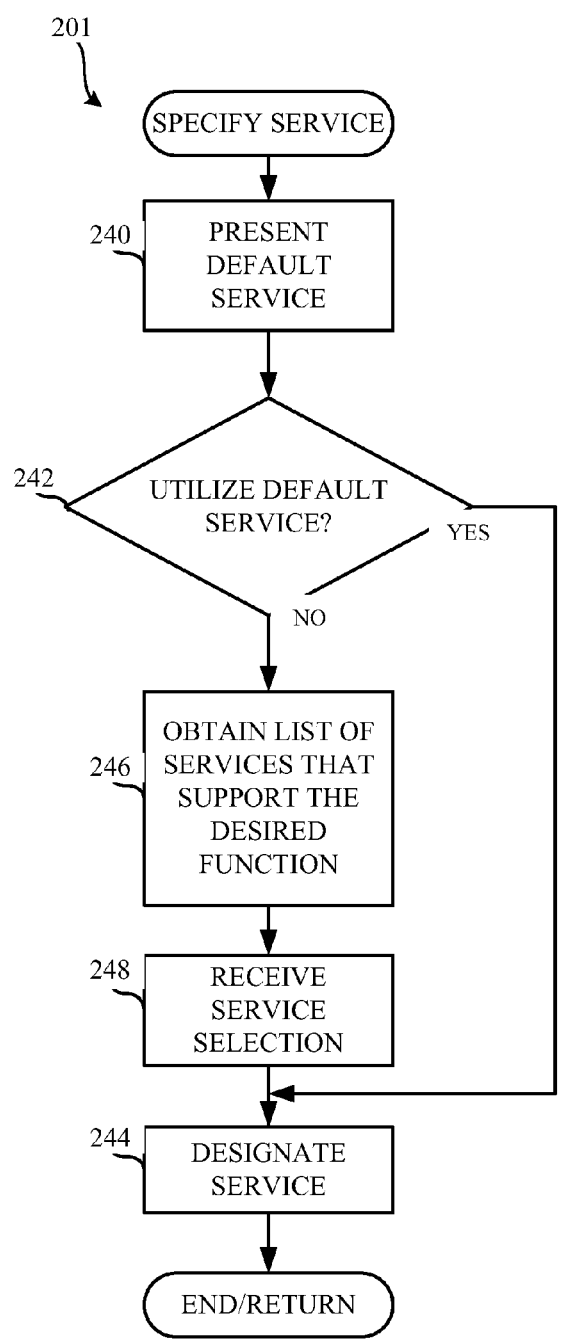
FIG. 2A                    FIG. 2B

METHODS AND APPARATUS TO SEND VOICE MESSAGES

CROSS REFERENCE TO RELATED APPLICATIONS

This application is a continuation-in-part of U.S. patent application Ser. No. 13/207,193, filed Aug. 10, 2011, the contents of which is expressly incorporated herein by reference.

FIELD OF THE DISCLOSURE

The present disclosure relates generally to communications and, more particularly, to methods and apparatus to send voice messages.

BACKGROUND

Voicemail messages are typically left for a call recipient when the recipient does not answer his or her telephone. In such situations, voicemail messages are left by a caller more or less in real time with placing a call to the call recipient. Sometime later, the call recipient may contact a voicemail server to retrieve voicemail messages.

BRIEF DESCRIPTION OF THE DRAWINGS

FIGS. 2A and 2B depict example flow diagrams representative of example processes to specify service as shown in FIG. 2.

DETAILED DESCRIPTION

Figure 1:
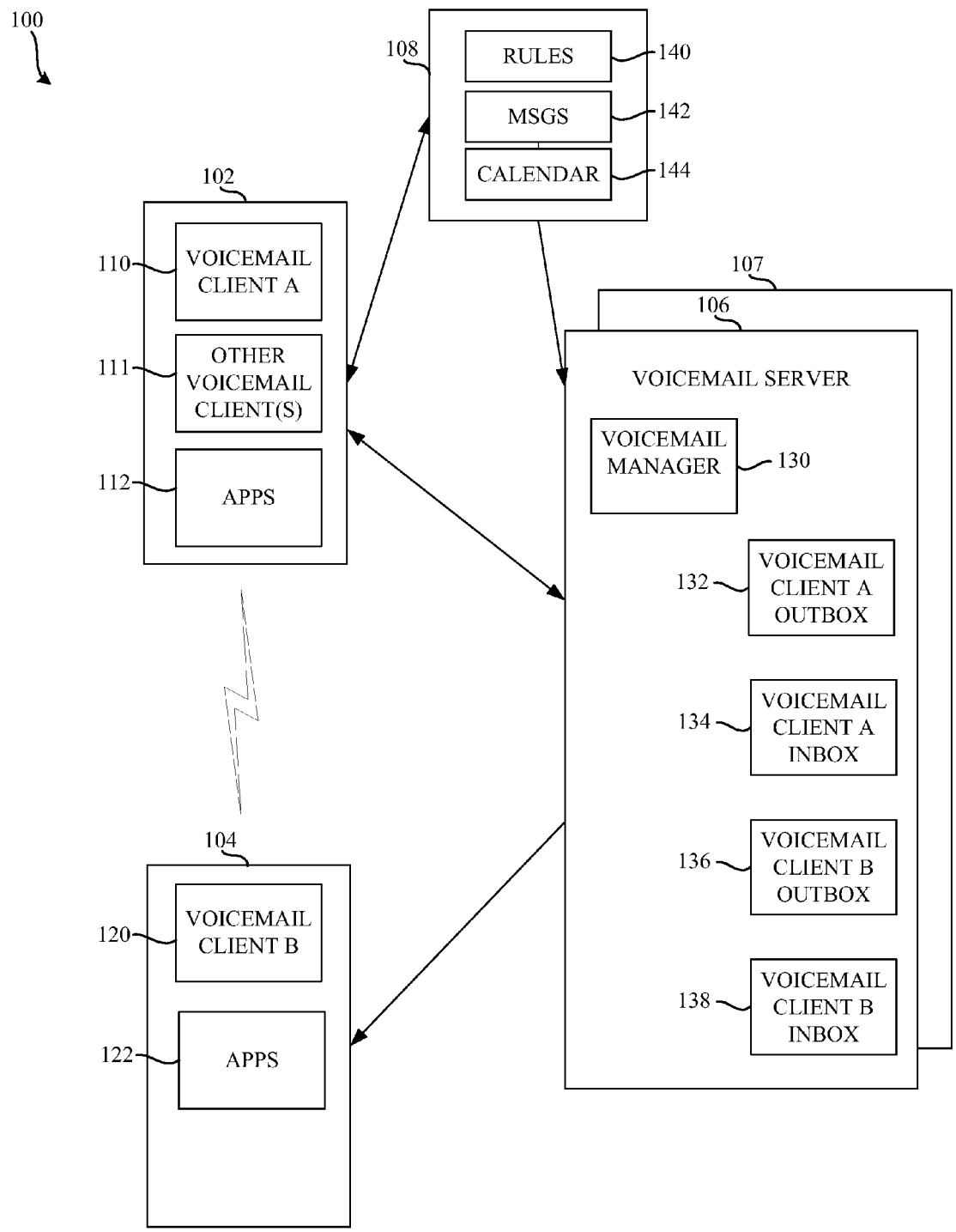
FIG. 1 depicts an example system for sending voice messages between mobile devices.

Although the following discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, apparatus, and articles of manufacture, persons having ordinary skill in the art will readily appreciate that the examples provided are not the only way to implement such methods, apparatus, and articles of manufacture.

For simplicity and clarity of illustration, where considered appropriate, reference numerals may be repeated among the figures to indicate corresponding or analogous elements. In addition, numerous specific details are set forth in order to provide a thorough understanding of examples disclosed herein. However, it will be understood by those of ordinary skill in the art that examples disclosed herein may be practiced without these specific details. In other instances, well-known methods, procedures, and components have not been described in detail so as not to obscure examples disclosed herein. Also, the description is not to be considered as limiting the scope of examples disclosed herein.

Example methods, apparatus, and articles of manufacture disclosed herein may be used in connection with telephony-capable mobile devices, which may be any mobile communication device, mobile computing device, or any other element, entity, device, or service capable of communicating wirelessly. Mobile devices, also referred to as terminals, wireless terminals, mobile stations, communication stations, user equipment (UE), or user devices, may include mobile smart phones (e.g., BlackBerry® smart phones), cellular telephones, wireless personal digital assistants (PDA), tablet/laptop/notebook/netbook computers with wireless adapters, etc.

Example methods, apparatus, and articles of manufacture disclosed herein facilitate operations in a mobile device and/or an associated server. Once example method includes receiving a selection of a service from a plurality of services; determining whether the selected service supports sending a voice message; recording the voice message using a mobile communication device; sending the voice message from the mobile communication device using the selected service if the selected service supports sending the voice message.

In one example, determining whether the selected service supports sending the voice message comprises obtaining supported functions of the selected service. The plurality of services may include a plurality of voicemail servers. In one example, determining whether the selected service supports sending the voice message comprises querying at least one of the plurality of voicemail servers. According to an example, when the selected service is a first service, the method may further include receiving a selection of a second service from the plurality of services when the first service does not support sending the voice message. The method may also include obtaining a list of the plurality of services, wherein each of the plurality of services supports sending the voice message. A default service may be presented to be used to send the voice message. In some examples, determining whether the selected service supports sending the voice message is carried out prior to receiving the selection of the service. The method may also include determining whether the selected service supports sending the voice message is carried out after receiving the selection of the service.

As described herein, a mobile device may include a housing; a display carried by the housing; a wireless receiver and transmitter carried by the housing; a processor carried by the housing, coupled to the wireless receiver and transmitter, and coupled to the display, the processor configured to receive a selection of a service from a plurality of services; determine whether the selected service supports sending a voice message; record the voice message using a mobile communication device; send the voice message from the mobile communication device using the selected service if the selected service supports sending the voice message.

In one example, determining whether the selected service supports sending the voice message comprises obtaining supported functions of the selected service. The plurality of services may include a plurality of voicemail servers. Determining whether the selected service supports sending the voice message may include querying at least one of the plurality of voicemail servers. In some cases, when the selected service is a first service, the processor may also receive a second service from the plurality of services when the first service does not support sending the voice message. The mobile device may also obtain a list of the plurality of services, wherein each of the plurality of services supports sending the voice message. In some examples the mobile device may present a default service to be used to send the voice message. Determining whether the selected service supports sending the voice message may be carried out prior to receiving the selection of the service. Determining whether the selected service supports sending the voice message may be carried out after receiving the selection of the service.

As shown in the example of FIG. 1, a first mobile device 102 desires to send a voice message to a second mobile device 104. As described below, sending the voice message from the mobile device 102 to the mobile device 104 may be contingent on receipt of communication and/or the occurrence of one or more other events (e.g., calendar events). Sending the message may include the use of voicemail servers 106, 107 and another server 108, such as an enterprise server or an electronic mail server. The contingency may be evaluated by the mobile device 102, the voicemail servers 106, 107 or the server 108. Accordingly, the voice message may be sent from the mobile device 102, the voicemail servers 106, 107, and/or the server 108.

In the example of FIG. 1, the mobile device 102 includes, among other things, voicemail clients 110, 111 and applications 112. In practice, the mobile device 102 may be implemented by a mobile telephone, a smart phone, a tablet computer, or any suitable device. The voicemail clients 110, 111 and the applications 112 may be implemented using hardware, software, firmware, coding, or any other suitable logic to facilitate the functionality described herein. Although not pictured in FIG. 1 for the sake of clarity, the mobile device 102 may include other functionality, such as wireless communication functionality, etc. The mobile device 102 is configured to communicate with the voicemail servers 106, 107 and/or the server 108, as well as suitable data networks (e.g., cellular networks, local area networks, etc.).

The voicemail clients 110, 111 may be software executed by the mobile device 102 to allow the mobile device 102 to interface with the voicemail servers 106, 107. In this manner, the mobile device 102 may send voicemail to the voicemail servers 106, 107 via the voicemail clients 110, 111. The voicemail client 110 is shown as voicemail client A in FIG. 1 and the voicemail clients 111 are referred to as other voicemail clients for purposes of explanation. The mobile device 102 may include multiple voicemail clients, each of which facilitates user interaction with voice messages associated with a voicemail server or voicemail servers. For example, with reference to FIG. 1, voicemail client A 110 of the mobile device 102 may be associated with the voicemail server 106, which may be associated with a network carrier that provides network connectivity to mobile device 102. Other voicemail servers 111 may be associated with one or more voicemail servers 107 of another entity (e.g., a voicemail server associated with an office or any other enterprise) or with any other voicemail server (e.g., a voicemail server associated with a subscription service).

Alternatively, rather than the mobile device 102 including multiple voicemail clients 110, 111, the voicemail client 110 may be an application that is configured to support multiple voicemail servers and to facilitate user interaction with numerous voicemail servers (e.g., the voicemail servers 106, 107). In such a case, the voicemail client 110 may include an account for each respective voicemail server to which the user has access. In either of these manners, the mobile device 102 may provide a user interface to visual voicemail (or any other voicemail) from numerous different sources.

As described below, the mobile device 102 may assess the function sets of associated voicemail servers (e.g., the voicemail servers 106, 107) to determine whether functionality is available. If the functionality is not available on a particular server, the mobile device may select a different voicemail server to perform a task involving that functionality. For example, the mobile device 102 may assess the function set of the voicemail servers 106, 107 to determine if voice message sending is possible utilizing a particular voicemail server. If voicemail sending functionality is available through one server (e.g., the voicemail server 106) but not another server (e.g., the voicemail server 107), the mobile device 102 will utilize the voicemail server having the functionality facilitate sending a voice message.

The applications 112 may include smart phone applications, such as an electronic mail client, a calendar application, etc. In one example, the applications 112 may include an electronic mail client that interfaces to the server 108 via any suitable data network. The applications 112 may include rules that are carried out by the mobile device 102 to facilitate sending voice messages using either the voicemail client 110 and the voicemail servers 106, 107 or the server 108, or both.

The mobile device 104 includes, among other things, a voicemail client 120 and applications 122. In practice, the mobile device 104 may be implemented by a mobile telephone, a smart phone, a tablet computer, or any suitable device. The voicemail client 120 and the applications 122 may be implemented using hardware, software, firmware, coding, or any other suitable logic to facilitate the functionality described herein. Although not pictured in FIG. 1 for the sake of clarity, the mobile device 104 may include other functionality, such as wireless communication functionality, etc. The mobile device 104 is configured to communicate with the voicemail servers 106, 107 as well as suitable data networks (e.g., cellular networks, local area networks, etc.).

The voicemail client 120 may be software executed by the mobile device 104 to allow the mobile device 104 to interface with the voicemail servers 106, 107. In this manner, the mobile device 104 may receive voicemail from the voicemail servers 106, 107 via the voicemail client 120. The voicemail client 120 is shown as voicemail client B in FIG. 1 for purposes of explanation.

As described above in conjunction with the mobile device 102, the applications 122 of the mobile device 104 may include smart phone applications, such as an electronic mail client, a calendar application, etc. For example, the applications 122 may include an electronic mail client that interfaces to an electronic mail server via any suitable data network.

The voicemail server 106 of the example of FIG. 1 includes a voicemail manager 130, a voicemail outbox for client A 132, a voicemail inbox for client A 134, a voicemail outbox for client B 136, and a voicemail inbox for client B 138. The voicemail manager 130, in addition to carrying out standard voicemail operations, may include functionality to carry out evaluations based on rules or criteria or may include functionality to facilitate the reception of a trigger from the mobile device 102 or the server 108. For example, the voicemail manager 130 may facilitate the storage of a voice message provided by the mobile device 102 in the voicemail outbox for client A 136. Subsequently, the voicemail manager 130 may evaluate one or more rules to determine if the voice message is to be transferred to the voicemail inbox for client B 138. The rules may have been previously provided to the voicemail manager 130 from the mobile device 102. In another example, the mobile device 102 or the server 108 may store and carryout the rules and, when voicemail is to be sent, the mobile device 102 or the server 108 may provide a trigger to the voicemail manager 130. In response to the trigger, the voicemail manager 130 may transfer the voice message to the voicemail inbox for client B 138, which will deliver the voice message to the mobile device 104.

The voicemail server 107 may include similar hardware and/or software, and/or functionality as described above in connection with the voicemail server 106. However, the voicemail server 107 may include different function sets than the function sets included in the voicemail server 106. For example, the voicemail server 106 may facilitate sending of voice messages as described herein, whereas the voicemail server 107 may, in some examples, not provide functionality to facilitate the sending of voice messages.

The server 108 may be implemented using any suitable combination of hardware and software. For example, the server 108 may be implemented as an enterprise server. In one example, the server 108 includes a rule store 140, one or more messages 142 (e.g., electronic mail messages, voice messages, etc.), and a calendar 144 including one or more events (e.g., meetings, appointments, etc.) listed therein.

In one example, the rule store 140 includes rules or criteria that the server 108 evaluates to determine if one or more voice messages are to be sent. For example, the rules store 140 may be populated using the mobile device 102.

The messages 142 may include electronic mail messages that are to be delivered to the mobile device 102 and may also include voice messages that are transferred to the server 108 from the mobile device 102.

The calendar 144 may include events, such as appointments, meetings, or any other suitable events, that are provided by the mobile device 102. In one example, the mobile device 102 may include a calendar application that includes similar information to the calendar 144 of the server 108.

In general, during operation, a user of the mobile device 102 records a voice message designated for the mobile device 104 and designates one or more rules, the satisfaction of which results in the delivery of the voice message. The rules may include any suitable information. For example, one rule may specify that a voice message is to be delivered to the mobile device 104 when the mobile device 102 receives communication (e.g., an electronic mail, a short message service message, etc.) from the mobile device 104. In another example, a voice message may be attached to an event after the event is created. For example, a voice message may be attached to a meeting event, wherein prior to the meeting a voice message is to be sent to each of the meeting participants reminding them of the meeting.

The voice message that is to be sent may be stored in any suitable location including within the mobile device 102, within the server 108 (e.g., in the messages 142), or within the voicemail servers 106, 107. The rules governing the sending of the message may be stored and evaluated by the mobile device 102, the voicemail servers 106, 107, or the server 108. For example, the voice message may be stored in the mobile device 102 and the mobile device 102 may evaluate one or more rules to control sending of the voice message. Alternatively, if the server 108 is capable of storing the voice message (e.g., in the messages 142) and evaluating rules (e.g., from the rules store 140), the server 108 may store the voice message and evaluate the rule(s). As a further alternative, the voicemail servers 106, 107 may store the voice message and either of the mobile device 102 or the server 108 may send a trigger to the voicemail servers 106, 107 to dispatch the voice message to the intended recipient.

FIGS. 2-5 depict example flow diagrams representative of processes that may be implemented using, for example, computer-readable instructions stored on a computer-readable medium to send voice messages. The example processes of FIGS. 2-5 may be performed using one or more processors, controllers, and/or any other suitable processing devices. For example, the example processes of FIGS. 2, 2A, 2B, and 4 may be implemented using coded instructions (e.g., computer readable instructions) stored on one or more tangible computer readable media such as flash memory, read-only memory (ROM), and/or random-access memory (RAM), such as may be found in the mobile device 102 of FIG. 1. As an additional example, the example processes of FIGS. 3 and 5 may be implemented using coded instructions (e.g., computer readable instructions) stored on one or more tangible computer readable media such as flash memory, read-only memory (ROM), and/or random-access memory (RAM), such as may be found in the voicemail servers 106, 107 or the server 108 of FIG. 1.

As used herein, the term tangible computer readable medium is expressly defined to include any type of computer readable storage and to exclude propagating signals. Additionally or alternatively, the example processes of FIGS. 2-5 may be implemented using coded instructions (e.g., computer-readable instructions or machine-accessible instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information).

As used herein, the term non-transitory computer-readable medium and non-transitory machine-accessible medium are expressly defined to include any type of computer-readable medium or machine-accessible medium.

Alternatively, some or all operations of the example processes of FIGS. 2-5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all operations of the example processes of FIGS. 2-5 may be implemented manually or as any combination(s) of any of the foregoing techniques, for example, any combination of firmware, software, discrete logic and/or hardware. Further, although the example processes of FIGS. 2-5 are described with reference to the flow diagrams of FIGS. 2-5, other methods of implementing the processes of FIGS. 2-5 may be employed. For example, the order of execution of the blocks may be changed, and/or some of the blocks described may be changed, eliminated, sub-divided, or combined. Additionally, any or all operations of the example processes of FIGS. 2-5 may be performed sequentially and/or in parallel by, for example, separate processing threads, processors, devices, discrete logic, circuits, etc.

In the illustrated example, the processes of FIGS. 2, 2A, 2B, and 4 are described below as performed by the mobile device 102 of FIG. 1. However, the example processes of FIGS. 2, 2A, 2B, and 4 may additionally or alternatively be implemented using any other suitable device or apparatus.

Figure 2:
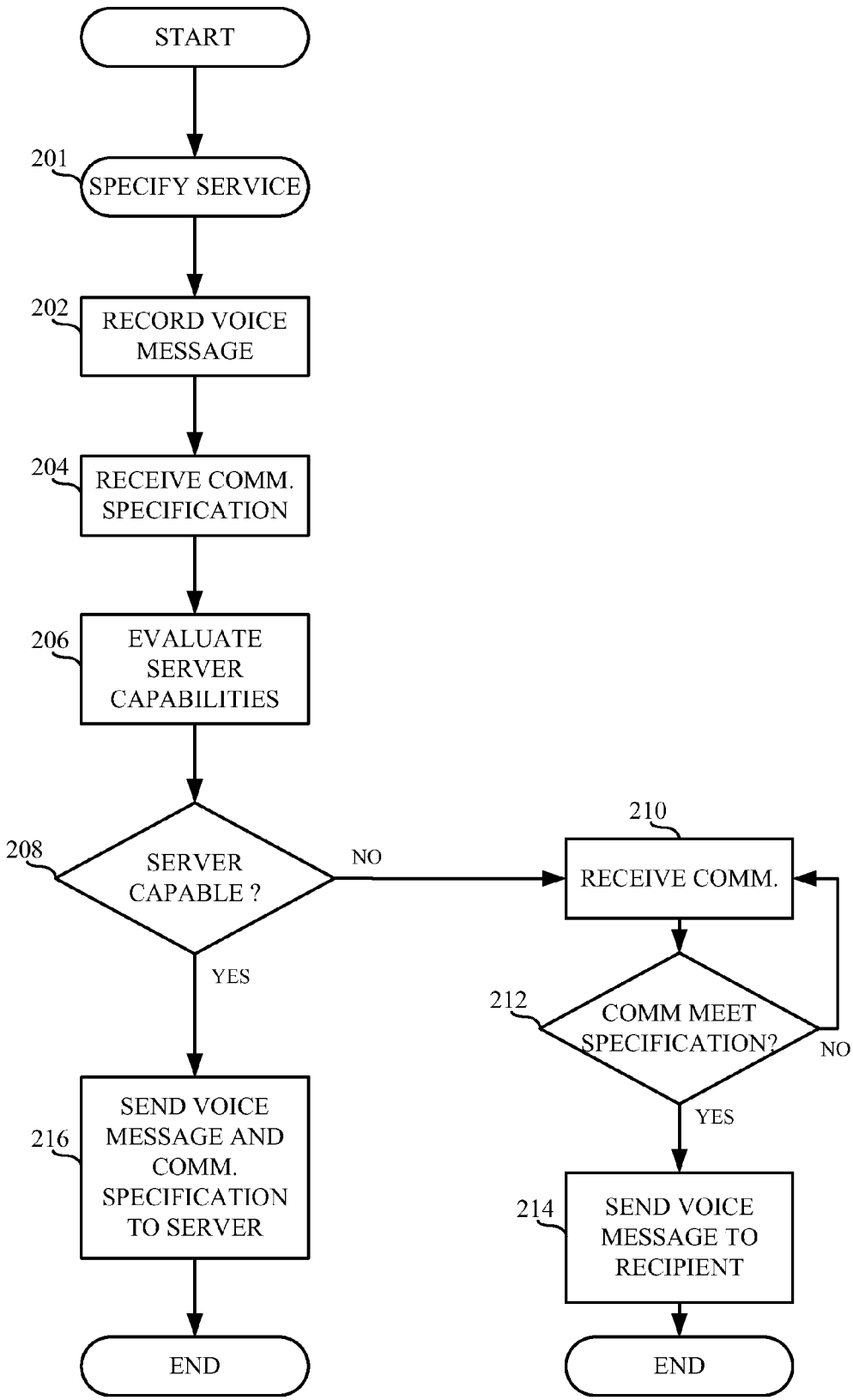
FIG. 2 depicts an example flow diagram representative of a process, which may be implemented using computer readable instructions on a mobile device that may be used to record and send voice messages in accordance with the system of FIG. 1.

Now turning to FIG. 2, an example process to send voice messages is shown. The process of FIG. 2 may be implemented using, for example, computer-readable instructions or any suitable combination of hardware and/or software and may be implemented on the mobile device 102 of FIG. 1. The mobile device 102 specifies a service to be used (block 201). Further detail regarding the service specification is provided below in conjunction with the examples of FIGS. 2A and 2B. The mobile device 102 records one or more voice messages, as well as an indication of the destination for the voice messages (block 202). In one example, the destination may be specified by a telephone number, an electronic mail address, or any other suitable indicator of the intended recipient.

If the voice message is to be sent to the recipient based on receipt of communication from a particular entity, a specification of that communication is received by the mobile device (block 204). For example, if the user of the mobile device 102 desires to specify that the voice message is to be sent upon receiving a communication from person X, an indicator of person X is provided as the communication specification. The indicator may be the identity of person X, the telephone of person X, an electronic mail address of person X, or any other suitable indicator.

The mobile device 102 evaluates server capabilities (block 206) to determine if any servers are available to store the voice message and to evaluate the communication specification against incoming communications. For example, the mobile device 102 may query the server 108 or the voicemail servers 106, 107 to determine if storage and evaluation resources are available.

If there is no server capable of the needed storage and evaluation functionality, the mobile device 102 handles the storage and evaluation itself. Thus, the mobile device 102 receives communication (block 210) and determines if the communication meets the specification (block 212). For example, the mobile device 102 determines whether communication (e.g., an electronic mail) has been received from person X at the mobile device 102 or at a server (e.g., the voicemail servers 106, 107 or the server 108) having an account associated with the mobile device 102.

The evaluation (block 212) will continue and, when the communication specification is met (e.g., an electronic mail is received from person X), the mobile device sends the voice message to the recipient (block 214). According to this approach, the voice message may be stored in the mobile device 102 and sent to the recipient from the mobile device 102. In another example, the voice message may be stored separately from the mobile device 102 and the mobile device 102 may provide a trigger for the voice message to be sent. For example, the voice message may be stored in the voicemail servers 106, 107 and the mobile device 102 may trigger sending of the message from the voicemail servers 106, 107.

Figure 3:
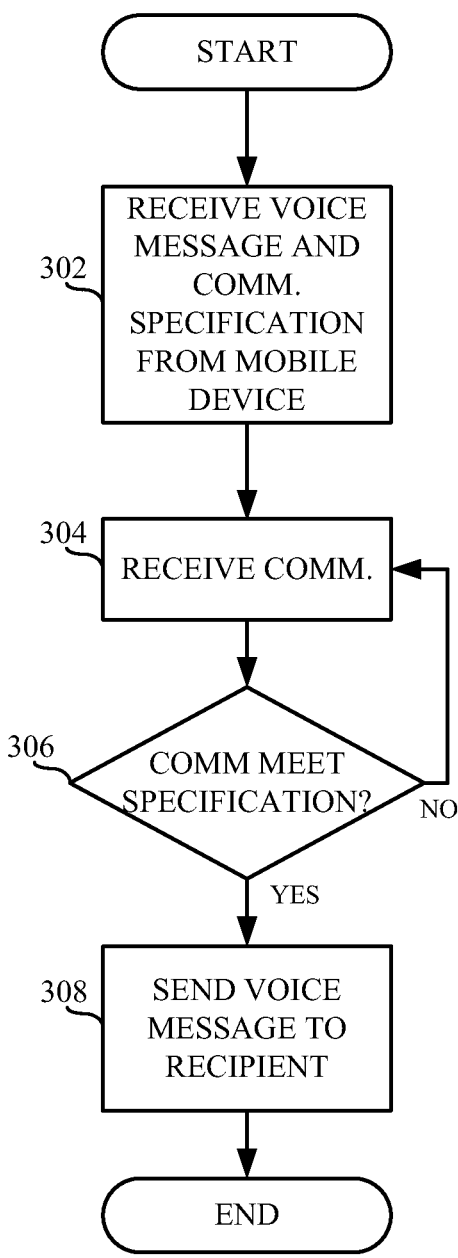
FIG. 3 depicts an example flow diagram representative of a process, which may be implemented using computer readable instructions on a server that may be used to send voice messages in accordance with the system of FIG. 1.

Alternatively, if a capable server is available (block 208), the mobile device 102 sends the voice message and the communication specification to the server (block 216). For example, if the mobile device 102 determines that the server 108 is available for the voice message storage and communication specification, the voice message and the communication specification may be provided to the server 108, which stores the voice message and the communication specification (e.g., rules). While the determination of server capabilities is shown as occurring after the recording of the voice mail message, this is not necessarily the case. In accordance with the foregoing example, the server 108 may operate as shown in FIG. 3 and as described below.

As shown in the example of FIG. 2A, in one example the specify service process 201 may include the mobile device receiving a service selection (block 220), which may be provided through user input. In one example, a user may provide to the mobile device 102 an indication that the user desires to utilize, for example, voicemail server 106.

The mobile device 102, upon receiving the selection (block 220), obtains the supported functions of the selected service (block 222). In one example, the mobile device 102 may query the selected service (e.g., the voicemail server 106) to obtain a list of functions supported by that service. In another example, the mobile device 102 may store a list of functions that are supported by the selected service. A stored list of functions may be pre-populated into the mobile device 102, or the mobile device 102 may have previously obtained the list of functions based on a prior query to the selected service. If the list is based on a prior query, there may be a time associated with the list of functions, whereby after a predetermined period of time, the list of functions associated with the service must be refreshed by querying the selected service.

When the list of supported functions has been obtained (block 222), the mobile device 102 evaluates the list of functions to determine if the desired function is supported (block 224). For example, if the mobile device 102 is being used to send a voice message and the selected service is to carry out the same, the mobile device 102 determines if voice message sending is supported by the functionality of the selected voicemail server. If the desired function is not supported by the selected service (block 224), the mobile device 102 may receive another service selection (block 220) by informing the user that the selected service does not support the desired function and prompting for a selection of another service.

If the desired function is supported by the selected service (block 224), the mobile device 102 designates that service for use to carry out the desired function (block 226). For example, if the voicemail server 106 supports sending voice messages, the voicemail server 106 is designated to send the voice message and is used as such.

An alternative example of the specify service process 201 is shown in the example of FIG. 2B. As shown in FIG. 2B, for a desired functionality, the mobile device 102 presents a default service (block 240). For example, if the user manifests a desire to send a voice message, the mobile device may present voicemail server 106 as the default service for the function of sending the voice message. The mobile device 102 determines if the default service is to be utilized (block 242). In one example, this determination may be made by evaluating user input to the mobile device 102. If the default service is to be used (block 242), the mobile device 102 designates that service for use to carry out the desired function (block 244). For example, if the voicemail server 106 is the default service that is to be used to send a voice message, the voicemail server 106 is designated to send the voice message and is used as such.

If the default service is not to be utilized (block 242), the mobile device 102 obtains a list of services that support the desired function (block 246). In one example, the mobile device 102 may query services (e.g., the voicemail server 106 and/or the voicemail server 107) to obtain a list of services that support the desired function (e.g., the sending of a voice message). In another example, the mobile device 102 may store a list of services that support the desired function. A stored list may be pre-populated into the mobile device 102, or the mobile device 102 may have previously obtained or determined the list based on prior queries to services to determine their functionality. If the list is based on prior queries, there may be a time associated with the list, whereby after a pre-determined period of time, the list must be refreshed.

When the list of services is obtained (block 246), the mobile device 102 receives a selection of a service that is to be used to carry out the desired function (block 248) and that service is designated (block 244), as described above.

In the example of FIG. 3, the server 108 receives the voice message and the communication specification from the mobile device 102 (block 302). Additionally, the server 108 receives communication (block 304) and evaluates the communication to determine whether the communication meets the specification (block 306). When a communication meets the communication specification (block 306), the voice message is sent to the recipient (block 308). The voice message may be sent to the recipient directly from the server 108 or may be sent to the recipient via the voicemail servers 106, 107.

Figure 4:
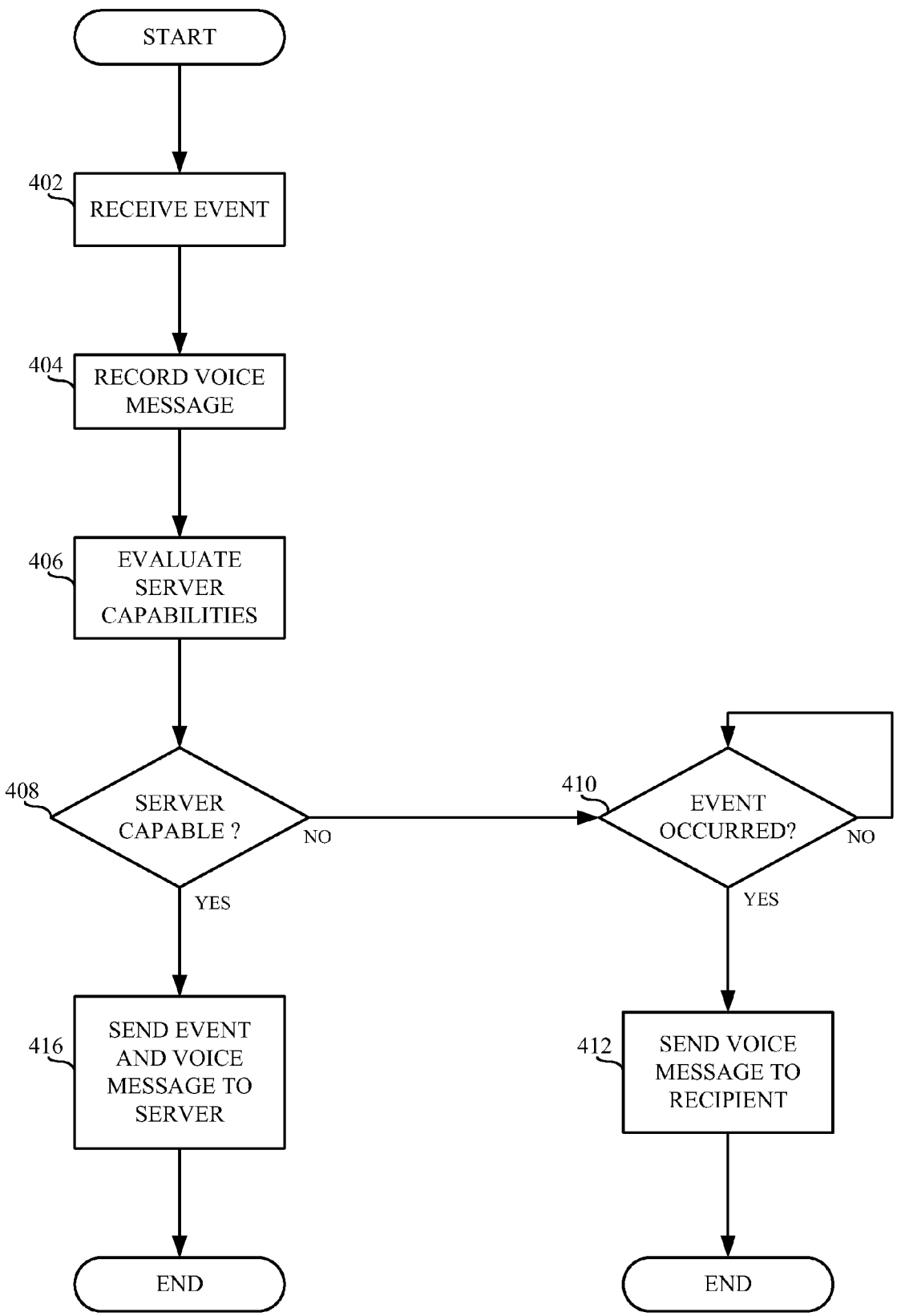
FIG. 4 depicts an example flow diagram representative of an alternate process, which may be implemented using computer readable instructions on a mobile device that may be used to record and send voice messages in accordance with the system of FIG. 1.

FIG. 4 is an example process to send voice messages in response to occurrence of a predefined event. The process of FIG. 4 may be implemented using, for example, computer-readable instructions or any suitable combination of hardware and/or software and may be implemented on the mobile device 102 of FIG. 1. The mobile device 102 receives an event, such as a calendar event (e.g., an appointment, a meeting, etc.) (block 402) and records one or more voice messages, as well as an indication of the destination for the voice messages (block 404) after the event is recorded. The voice message is to be sent to recipients in response to the occurrence of the event. For example, a voice message reminder may be sent in advance of a meeting calendar event. In one example, the destination for the voice message may be specified in the event information by a telephone number, an electronic mail address, or any other suitable indicator of the intended recipient.

The mobile device 102 evaluates server capabilities (block 406) to determine if any servers are capable of storing the voice message and evaluating whether the specified event has occurred (block 408). For example, the mobile device 102 may query the server 108 or the voicemail servers 106, 107 to determine if storage and evaluation resources are available. In one particular example, the server 108, as described above, may include the calendar 144 including the events and associated event information and the message storage 142. As such, the server 108 may be particularly well suited to evaluate whether the specified even has occurred.

If there is no server capable of the needed storage and evaluation, the mobile device 102 determines if the event has occurred (block 410). For example, the mobile device 102 determines whether a calendar event has occurred. The evaluation (block 410) will continue and when the communication specification is met (e.g., a particular calendar event has occurred), the mobile device sends the voice message to the recipient (block 412). According to this approach, the voice message may be stored in the mobile device 102 and sent to the recipient from the mobile device or the voice message may be stored separately from the mobile device 102 and the mobile device may provide a trigger for the voice message to be sent. For example, the voice message may be stored in the voicemail servers 106, 107 and the mobile device 102 may trigger sending of the message from the voicemail servers 106, 107.

Alternatively, if a capable server is available (block 408), the mobile device 102 sends the voice message and the event to the server (block 416). For example, if the mobile device 102 determines that the server 108 is available for the voice message storage 142 and event storage 144, the voice message and the event may be provided to the server 108. While the determination of server capabilities is shown as occurring after the recording of the voice mail message, this is not necessarily the case. In accordance with the foregoing example, the server 108 may operate as shown in FIG. 5.

Figure 5:
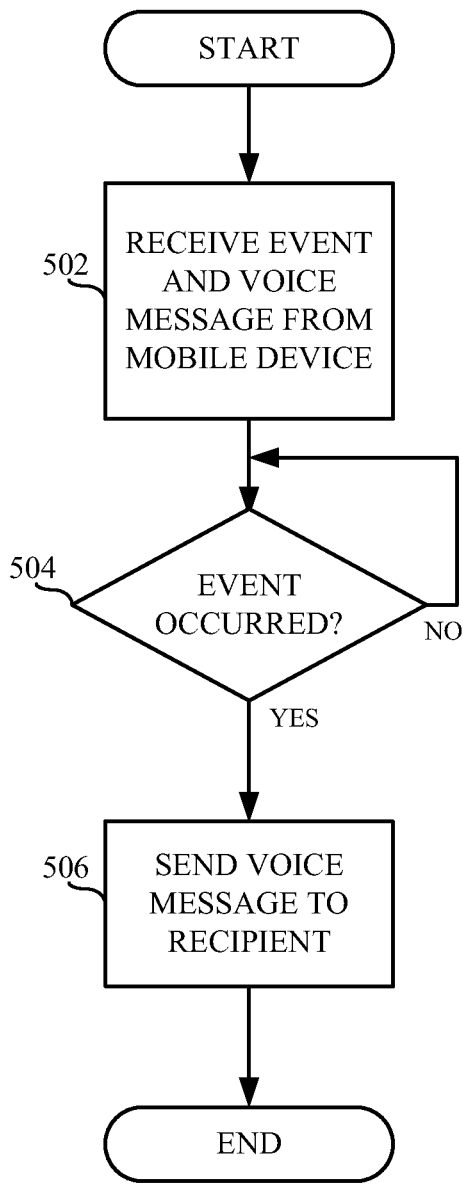
FIG. 5 depicts an example flow diagram representative of an alternate process, which may be implemented using computer readable instructions on a server that may be used to send voice messages in accordance with the system of FIG. 1.

In the example of FIG. 5, the server 108 receives the voice message and the event from the mobile device 102 (block 502). The server 108 determines whether the event has occurred (block 504). When the event has occurred (block 504), the voice message is sent to the recipient (block 506). The voice message may be sent to the recipient directly from the server 108 or may be sent to the recipient via the voicemail servers 106, 107.

Figure 6:
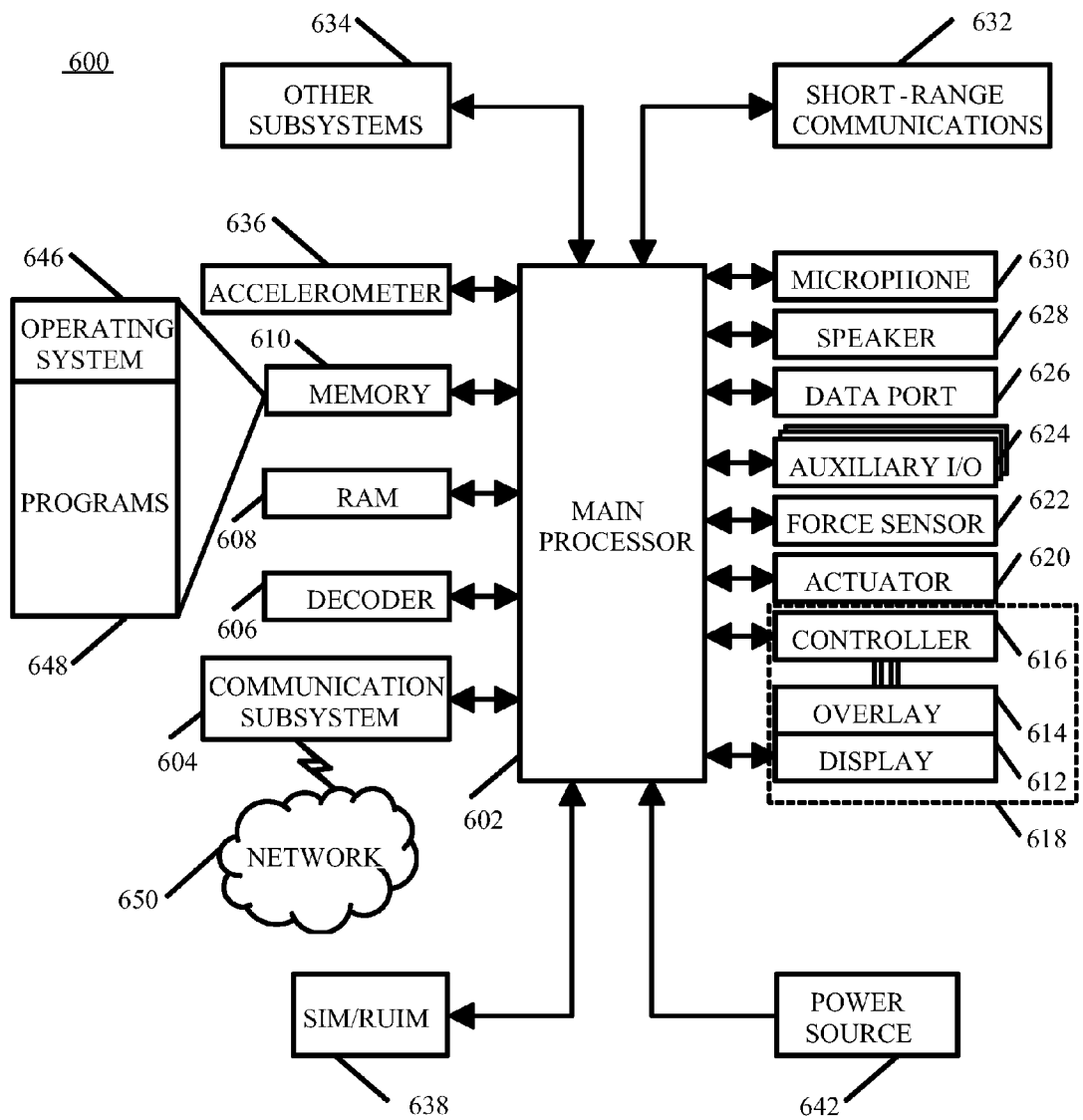
FIG. 6 is a block diagram of a mobile device in accordance with the disclosure.

Further detail of certain aspects of the mobile devices 102, 104 of FIG. 1 are shown in FIG. 6 with respect to a mobile, or portable electronic, device 600. The mobile device 600 includes multiple components, such as a processor 602 that controls the overall operation of the mobile device 600. Communication functions, including data and voice communications, are performed through a communication subsystem 604. Data received by the mobile device 600 is decompressed and decrypted by a decoder 606. The communication subsystem 604 receives messages from and sends messages to a wireless network 650. The wireless network 650 may be any type of wireless network, including, but not limited to, data wireless networks, voice wireless networks, and networks that support both voice and data communications. A power source 642, such as one or more rechargeable batteries or a port to an external power supply, powers the mobile device 600.

The processor 602 interacts with other components, such as Random Access Memory (RAM) 608, memory 610, a display 612 with a touch-sensitive overlay 614 operably coupled to an electronic controller 616 that together comprise a touch-sensitive display 618, one or more actuators 620, one or more force sensors 622, an auxiliary input/output (I/O) subsystem 624, a data port 626, a speaker 628, a microphone 630, short-range communications 632, and other device subsystems 634. In one example, the processor 602 and the memory 610 may cooperate to implement the functionality described in conjunction with the controllers 124 and 134 of FIG. 1. For example, tangible and/or non-transitory, and/or machine readable instructions may be stored by the processor 602 and/or the memory 610 to implement the functionality shown in FIGS. 2-4.

Input via a graphical user interface is provided via the touch-sensitive overlay 614. The processor 602 interacts with the touch-sensitive overlay 614 via the electronic controller 616. Information, such as text, characters, symbols, images, icons, and other items that may be displayed or rendered on a mobile device, is displayed on the touch-sensitive display 618 via the processor 602. The processor 602 may interact with an accelerometer 636 that may be utilized to detect direction of gravitational forces or gravity-induced reaction forces.

To identify a subscriber for network access, the mobile device 600 may utilize a Subscriber Identity Module or a Removable User Identity Module (SIM/RUIM) card 638 for communication with a network, such as the wireless network 650. Alternatively, user identification information may be programmed into memory 610.

The mobile device 600 includes an operating system 646 and software programs, applications, or components 648 that are executed by the processor 602 and are typically stored in a persistent, updatable store such as the memory 610. Additional applications or programs may be loaded onto the mobile device 600 through the wireless network 650, the auxiliary I/O subsystem 624, the data port 626, the short-range communications subsystem 632, or any other suitable subsystem 634.

A received signal such as a text message, an e-mail message, or web page download is processed by the communication subsystem 604 and input to the processor 602. The processor 602 processes the received signal for output to the display 612 and/or to the auxiliary I/O subsystem 624. A subscriber may generate data items, for example e-mail messages, which may be transmitted over the wireless network 650 through the communication subsystem 604. For voice communications, the overall operation of the mobile device 600 is similar. The speaker 628 outputs audible information converted from electrical signals, and the microphone 630 converts audible information into electrical signals for processing.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
   recording a voice message through a microphone of a mobile communication device;
   storing the voice message in memory of the mobile communication device;
   receiving in the mobile communication device a selection of a voice mail server from amongst a plurality of voice mail servers;
   determining whether the selected voice mail server supports sending a voice message; and,
   sending the recorded voice message from the mobile communication device over a wireless network using the selected voice mail server if the selected voice mail server supports sending the voice message.

2. The method of claim 1, wherein determining whether the selected voice mail supports sending the voice message comprises obtaining supported functions of the selected voice mail server.

3. The method of claim 1, wherein determining whether the selected voice mail server supports sending the voice message comprises querying at least one of the plurality of voice-mail servers.

4. The method of claim 1, wherein the selected voice mail server is a first voice mail server, further comprising a selection of a second voice mail server from the plurality of voice mail servers when the first voice mail server does not support sending the voice message.

5. The method of claim 1, further comprising obtaining a list of the plurality of voice mail server, wherein each of the plurality of voice mail server supports sending the voice message.

6. The method of claim 5, further comprising presenting a default voice mail server to be used to send the voice message.

7. The method of claim 1, wherein determining whether the selected voice mail server supports sending the voice message is carried out prior to receiving the selection of the voice mail server.

8. The method of claim 1, wherein determining whether the selected voice mail server supports sending the voice message is carried out after receiving the selection of the voice mail server.

9. A mobile device comprising:
   a housing;
   a display carried by the housing;
   a wireless receiver and transmitter carried by the housing;
   a processor carried by the housing, coupled to the wireless receiver and transmitter, and coupled to the display, the processor configured to receive a selection of a voice mail server from a plurality of voice mail servers; determine whether the selected voice mail server supports sending a voice message; record the voice message using a mobile communication device; send the voice message over a wireless network from the mobile communication device using the selected voice mail server if the selected voice mail server supports sending the voice message.

10. The mobile device of claim 9, wherein determining whether the selected voice mail server supports sending the voice message comprises obtaining supported functions of the selected voice mail server.

11. The mobile device of claim 9, wherein determining whether the selected voice mail server supports sending the voice message comprises querying at least one of the plurality of voice mail servers.

12. The mobile device of claim 9, wherein the selected voice mail server is a first voice mail server, the processor further configured to receive a selection of a second voice mail server from the plurality of voice mail server when the first voice mail server does not support sending the voice message.

13. The mobile device of claim 9, wherein the processor is further configured to obtain a list of the plurality of voice mail server, wherein each of the plurality of voice mail server supports sending the voice message.

14. The mobile device of claim 13, further comprising presenting a default voice mail server to be used to send the voice message.

15. The mobile device of claim 9, wherein the processor is further configured to determine whether the selected voice mail server supports sending the voice message is carried out prior to receiving the selection of the voice mail server.

16. The mobile device of claim 9, wherein the processor is further configured to determine whether the selected voice mail server supports sending the voice message is carried out after receiving the selection of the voice mail server.

* * * * *